US011180901B2

(12) United States Patent
Hyodo et al.

(10) Patent No.: US 11,180,901 B2
(45) Date of Patent: Nov. 23, 2021

(54) WORK VEHICLE

(71) Applicant: Hitachi Construction Machinery Co., Ltd., Tokyo (JP)

(72) Inventors: Koji Hyodo, Ibaraki (JP); Tetsuji Tanaka, Chiba (JP); Isamu Aoki, Ibaraki (JP); Kouji Shimazaki, Hyogo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 163 days.

(21) Appl. No.: 16/640,257

(22) PCT Filed: Mar. 15, 2019

(86) PCT No.: PCT/JP2019/010810
§ 371 (c)(1),
(2) Date: Feb. 19, 2020

(87) PCT Pub. No.: WO2019/188407
PCT Pub. Date: Oct. 3, 2019

(65) Prior Publication Data
US 2020/0362540 A1  Nov. 19, 2020

(30) Foreign Application Priority Data
Mar. 29, 2018 (JP) .............................. JP2018-065838

(51) Int. Cl.
*E02F 9/26* (2006.01)
*B60Q 9/00* (2006.01)
*B60T 17/22* (2006.01)

(52) U.S. Cl.
CPC .................. *E02F 9/26* (2013.01); *B60Q 9/00* (2013.01); *B60T 17/221* (2013.01)

(58) Field of Classification Search
CPC ......... B60Q 9/00; B60T 17/22; B60T 17/221; B60Y 2200/41; F02D 11/105;
(Continued)

(56) References Cited

U.S. PATENT DOCUMENTS 4,485,444 A    11/1984  Maruyama et al.
6,030,314 A *   2/2000  Brooks ..................... B60T 5/00
                                                   303/191
(Continued)

FOREIGN PATENT DOCUMENTS

JP        57-95240 A      6/1982
JP        10-9306 A       1/1998
JP      2015-140767 A     8/2015

OTHER PUBLICATIONS

International Search Report (PCT/ISA/210) issued in PCT Application No. PCT/JP2019 /010810 dated Jun. 11, 2019 with English translation (two (2) pages).
(Continued)

*Primary Examiner* — Tyler J Lee
(74) *Attorney, Agent, or Firm* — Crowell & Moring LLP (57) ABSTRACT

A work vehicle is provided. The work vehicle is capable of notifying an operator of a state close to overheating of a temperature of a cooling oil that cools a brake device before the temperature overheats. A controller (10) in a work vehicle (100) compares each detection value detected from a brake pressure sensor (26) and a vehicle speed sensor (15) to each threshold (V1, P1, R1) predetermined corresponding to each sensor. The controller (10) outputs a warning command that a temperature of a cooling oil is likely to overheat to a notification device (28) when a state that at least one detection value is equal to or more than the threshold and when a state that at least one detection value is equal to or more than the threshold continues for a first duration (t1) or more.

9 Claims, 9 Drawing Sheets

(58) Field of Classification Search
CPC .... F02D 31/001; F02D 41/021; E02F 9/2083; E02F 9/26; E02F 9/267; F16D 2066/001; F16D 2066/003; F16D 2066/005; F16D 65/853
See application file for complete search history.

(56) References Cited

U.S. PATENT DOCUMENTS

| | | | |
|---|---|---|---|
| 6,115,662 A | | 9/2000 | Sugano et al. |
| 7,625,312 B2* | | 12/2009 | Ido ..................... F16H 57/0413 477/110 |
| 2006/0207842 A1* | | 9/2006 | Strandberg .............. B60T 17/22 188/264 D |
| 2016/0201582 A1 | | 7/2016 | Aoki et al. |

OTHER PUBLICATIONS

Japanese-language Written Opinion (PCT/ISA/237) issued in PCT Application No. PCT/JP2019/010810 dated Jun. 11, 2019 (five (5) pages).

* cited by examiner

WORK VEHICLE

TECHNICAL FIELD

The present invention relates to a work vehicle such as a wheel loader.

BACKGROUND ART

As a known technique for a wheel loader that is an example of work vehicles, a temperature (axle oil temperature) of cooling oil that cools a brake is detected, and when the temperature of the cooling oil is equal to or more than a predetermined value, the highest rotation speed of an engine is restricted (see Patent Literature 1).

In the prior art in Patent Literature 1, when the temperature of the cooling oil detected by a temperature sensor is equal to or more than a predetermined value (threshold), the highest rotation speed of the engine is restricted lower than that when the cooling oil temperature is less than the predetermined value. Brake operation is thus prevented at the highest rotation speed. Additionally, the frequency of brake operations is reduced by limiting the highest rotation speed. The increase in the temperature of the cooling oil that cools the brake can be thus restricted.

CITATION LIST

Patent Literature

PATENT LITERATURE 1: Japanese Patent Application Laid-Open No. 2015-140767

SUMMARY OF INVENTION

Technical Problem

In the prior art in Patent Literature 1, when the temperature of the cooling oil that cools the brake is a predetermined value or more, the highest rotation speed of the engine is restricted low. The increase in the temperature of the cooling oil can be thus restricted. However, even when the temperature of the cooling oil is likely to overheat, the operator cannot recognize the likelihood. When work in which the temperature of cooling oil is likely to overheat is continuously performed, for example, when brake operations are frequently performed for loading operations for long time, the temperature of the cooling oil gradually increases. This may cause overheating.

For addressing such situation of Prior Art, an object of the present invention is to provide a work vehicle capable of notifying an operator that overheating is approaching before the temperature of cooling oil that cools a brake device overheats.

Solution to Problem

As a typical aspect of the present invention to attain the above object, a work vehicle includes a work vehicle having an engine, a hydraulic brake device that generates a braking force in response to a pressure of hydraulic oil, and a brake pedal to actuate the brake device. The work vehicle includes at least one of a brake pedal operation amount sensor that detects an operation amount of the brake pedal and a brake pressure sensor that detects a pressure of the hydraulic oil supplied to the brake device, a cooling oil temperature sensor that detects a temperature of the cooling oil that cools the brake device, a vehicle speed sensor that detects a vehicle speed, a notification device that notifies an operator of information about a temperature of the cooling oil, and a controller that controls the notification device. The controller compares each detection value detected by at least one of the brake pedal operation amount sensor and the brake pressure sensor and by the vehicle speed sensor to each threshold predetermined corresponding to each sensor. In a case where a state that at least one of the detection values is equal to or more than the threshold continues for a first duration or more, the controller outputs a warning command that the temperature of the cooling oil is likely to overheat to the notification device.

Advantageous Effects of Invention

A work vehicle of the present invention can exactly notify an operator that overheating is approaching before the temperature of cooling oil that cools a brake device overheats. Problems, structures, and advantageous effects other than the above described ones are made clear in explanation of the following embodiments.

DESCRIPTION OF EMBODIMENT

Hereafter, embodiments of the present invention are described in reference to the drawings.

Figure 1:
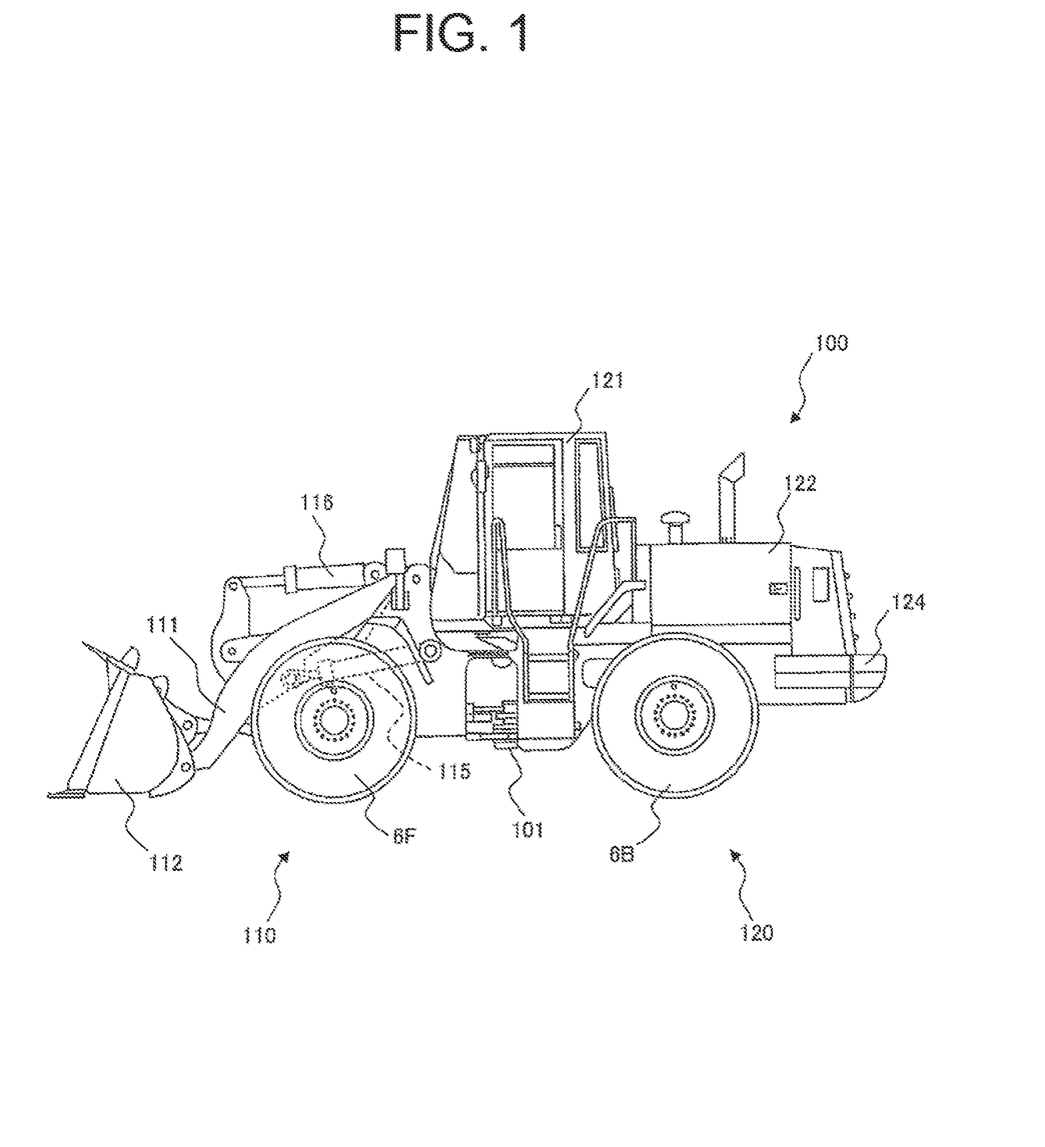
FIG. 1 is a side view of a wheel loader of embodiments of the present invention.

FIG. 1 is a side view of a wheel loader 100 that is an example of a work vehicle of embodiments of the present invention. The wheel loader 100 includes a front frame 110 including an arm 111, a bucket 112, and tires 6F and a rear frame 120 including a cab 121, an engine compartment 122, and tires 6B. An engine (mentioned later) is mounted to the engine compartment 122. A counterweight 124 is attached rearward of the rear frame 120.

The arm 111 pivots upward and downward (moves upward and downward) in response to actuation of arm cylinders 115. The bucket 112 pivots upward and downward (cloud or dump) in response to actuation of a bucket cylinder 116. The front frame 110 and the rear frame 120 are pivotally connected to each other by a center pin 101. The front frame 110 deflects right and left relative to the rear frame 120 in response to retraction and extension of an unillustrated steering cylinder.

Figure 2:
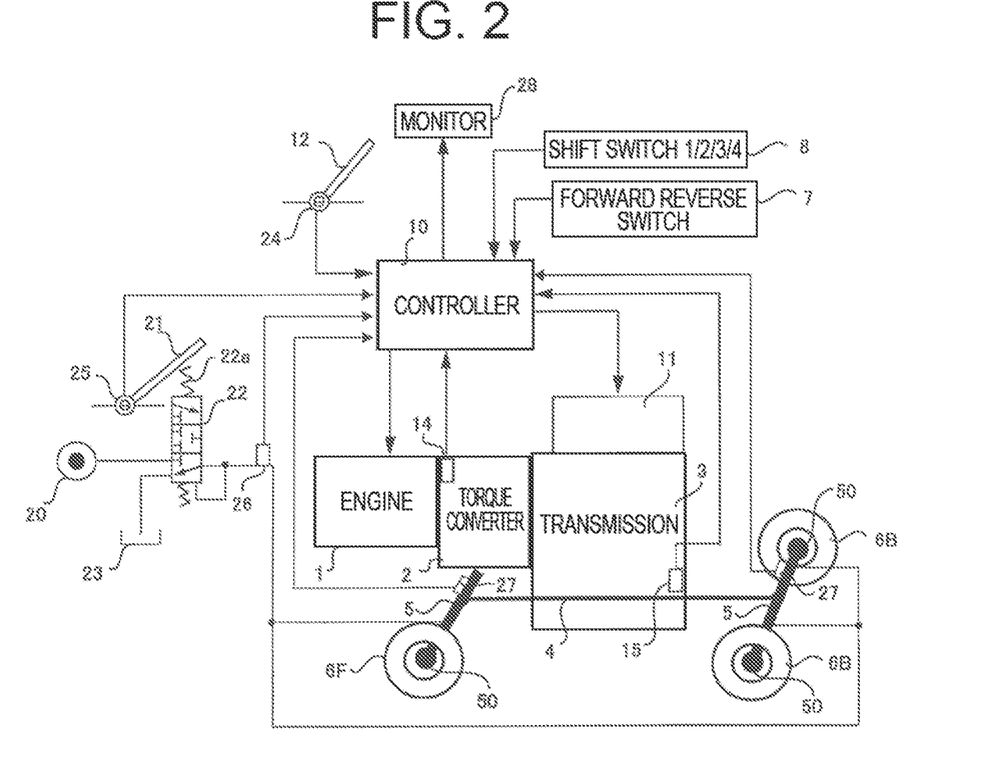
FIG. 2 is a structural diagram of a hydraulic circuit including an engine and a controller in the wheel loader.

FIG. 2 is a structural diagram of a hydraulic circuit including an engine 1 and a controller 10. An unillustrated input shaft of a torque converter 2 is coupled to an output shaft of the engine 1. An unillustrated output shaft of the torque converter 2 is coupled to a transmission 3. The torque converter 2 is a hydraulic clutch including a known impeller, a turbine, and a stator. Rotation of the engine 1 is transmitted to the transmission 3 via the torque converter 2. The transmission 3 has a hydraulic clutch to shift among the first to fourth gears. The rotation of the output shaft of the torque converter 2 is changed in speed by the transmission 3. The rotation after gear shift is transmitted to the tires 6F and 6B via a propeller shaft 4 and an axle 5. The wheel loader 100 then travels.

The driving force of the propeller shaft 4 is transmitted to the axle 5 via an unillustrated differential. The differential includes a group of gears to transmit the driving force of the propeller shaft 4 to the axle 5 and a multi plate wet disc brake (brake device) 50 attached to the axle 5. The group of gears is accommodated in a differential body. The disc brake 50 is accommodated in a brake case. The differential body and the brake case are continuously connected to each other to be one case. A brake cooling oil that cools the gear group and the disc brake 50 is accommodated in the case. An oil temperature sensor 27 that detects a temperature of the brake cooling oil (axle oil temperature) is provided to the case of the axle 5.

When supplied with hydraulic oil via a brake valve 22, the disc brake 50 generates a braking force in response to a pressure of the hydraulic oil. The brake valve 22 is a pressure reducing valve that reduces a pressure of the pressure oil supplied from a hydraulic pressure source 20 of the hydraulic oil in response to a compression force of a spring 22a. When an operator depresses the brake pedal 21 provided in the cab 121 to compress the spring 22a in response to the depressing force of the brake pedal 21, the brake valve 22 reduces the pressure of the pressure oil supplied from the hydraulic pressure source 20 in response to the depressing force of the brake pedal 21. The brake valve 22 reduces the pressure of the hydraulic oil to supply a more highly pressured hydraulic oil to the disc brake 50 as the compression force of the spring 22a is greater, that is, as the depression force of the brake pedal 21 is greater. The reference sign 23 indicates a hydraulic oil tank.

The torque converter 2 increases an output torque relative to an input torque, that is, makes a torque ratio equal to or more than 1. The torque ratio decreases in response to an increase in a torque converter speed ratio e that is a ratio of an output rotation speed Nco relative to an input rotation speed Nci (=output rotation speed Nco/input rotation speed Nci). For example, when a travel load becomes large during travel at a constant engine rotation speed, the rotation speed Nco of the output shaft of the torque converter 2 decreases. That is, the vehicle speed decreases and the torque converter speed ratio e decreases. The torque ratio increases at this time. Vehicle travel becomes possible with a greater travel driving force (traction).

The transmission 3 is an automatic transmission having solenoid valves respectively corresponding to the first to fourth speeds. As below, the solenoid valves are driven by control signals outputted from the controller 10 to the transmission control section 11. The transmission 3 is shifted in response to the control signals.

The controller 10 includes a processing unit having a CPU, a ROM and a RAM that are storages, and others such as a peripheral circuitry. The CPU reads and executes programs in the storage to execute the after-mentioned warning, etc. A forward reverse switch 7, a shift switch 8, an engine rotation speed sensor 14, a vehicle speed sensor 15, an accelerator pedal operation amount sensor 24, a brake pedal operation amount sensor 25, a pressure sensor (brake pressure sensor) 26, and the oil temperature (cooling oil temperature sensor) 27 are connected to the controller 10.

The engine rotation speed sensor 14 is provided to the output shaft of the engine 1 and detects a rotation speed of the output shaft of the engine 1. The vehicle speed sensor 15 is provided to the output shaft of the transmission 3 to detect a travel speed (hereinafter a vehicle speed) of a vehicle. The oil temperature sensor 27 is provided to the axle 5 to detect a temperature of the brake cooling oil in the axle 5.

The forward reverse switch 7 is provided to the cab 121. The operator switches the forward reverse switch 7 to the forward position. A forward switch signal for forward travel is then outputted to the controller 10. The controller 10 outputs a control signal for engagement of the forward clutch of the transmission 3 to the transmission control section 11. When the transmission control section 11 receives the control signal for forward travel, a clutch control valve (unillustrated) provided to the transmission control section 11 operates to make the forward clutch enter the engagement state. The traveling direction of the vehicle body is then switched to the forward direction. Switching to the reverse travel of the vehicle body is also made through the similar procedure.

The shift switch 8 is provided to the cab 121 and used by the operator to indicate the upper limit speed among the first to fourth speeds. The transmission 3 is automatically shifted to the speed selected by the shift switch 8 as the upper limit speed. For example, when the second speed is selected by the shift switch 8, the speed is set to the first speed or second speed. When the first speed is selected, the speed is fixed to the first speed.

The accelerator pedal operation amount sensor 24 detects a variable of pedal depression (pedal stroke or pedal angle) of an accelerator pedal 12. The accelerator pedal 12 is provided to the cab 121. When the operator depresses the accelerator pedal 12, the engine 1 rotates and accordingly the input shaft of the torque converter 2 rotates. The output shaft of the torque converter 2 rotates in response to a set reduction ratio of the torque converter. As described above, the output torque is transmitted from the torque converter 2 to the tires 6F, 6B via the transmission 3, the propeller shaft 4, and the axle 5 to make the wheel loader 100 travel.

Specifically, the pedal depression variable of the accelerator pedal 12 detected by the accelerator pedal operation amount sensor 24 is inputted into the controller 10. A target engine rotation speed is outputted from the controller 10 to the engine 1 as a command signal. The rotation speed (the number of rotations) of the engine 1 is controlled in response to this target engine rotation speed.

Figure 3:
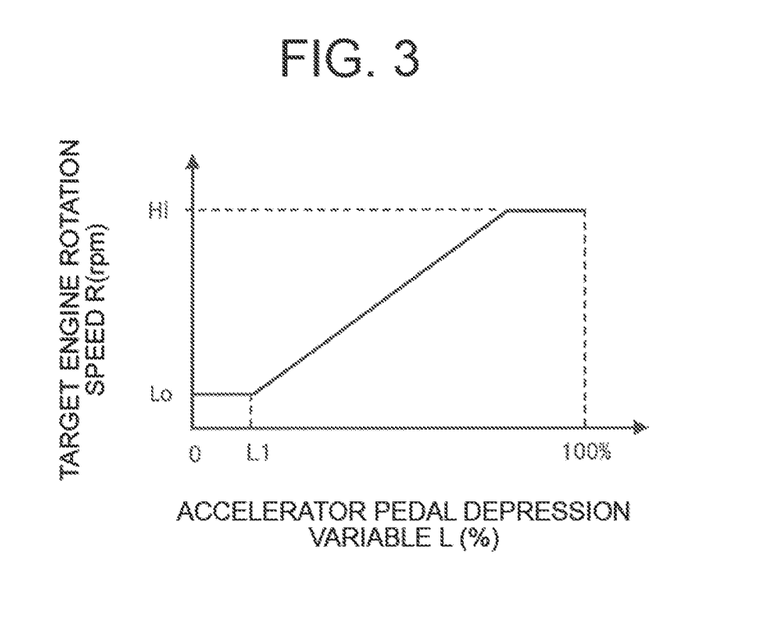
FIG. 3 is an illustrative diagram showing a relationship between a variable of depression of an accelerator pedal and a target engine rotation speed.

FIG. 3 is an illustrative view showing a relationship between a depression variable of the accelerator pedal 12 and a target engine rotation speed. As in FIG. 3, the depression variable of the accelerator pedal 12 and the target engine rotation speed are proportional to each other. As the depression variable of the accelerator pedal 12 is greater, the target engine rotation speed is faster. The rotation speed of the output shaft of the torque converter 2 increases and the vehicle speed increases.

In a depression variable from 0% to 20 or 30% of the accelerator pedal 12 in FIG. 3, the target engine rotation speed is constant at a minimum target engine rotation speed Lo irrespective of the depression variable of the accelerator pedal 12. In a depression variable from 70 or 80 to 100% of the accelerator pedal 12, the target engine rotation speed is constant at a highest target engine rotation speed Hi irrespective of the depression variable of the accelerator pedal 12.

The brake pedal operation amount sensor 25 detects a variable of pedal depression (pedal stroke or pedal angle) of the brake pedal 21. As described above, when the operator depresses the brake pedal 21, the brake valve 22 reduces the pressure of the pressure oil supplied from the hydraulic pressure source 20 to the disc brake 50 in response to the depression force of the brake pedal 21. The pressure sensor 26 is provided to a pressure oil line from the brake valve 22 to disc brake 50 to detect a pressure of the hydraulic oil supplied to the disc brake 50. That is, the pressure sensor 26 detects the brake pressure of the brake pedal 21.

Figure 4:
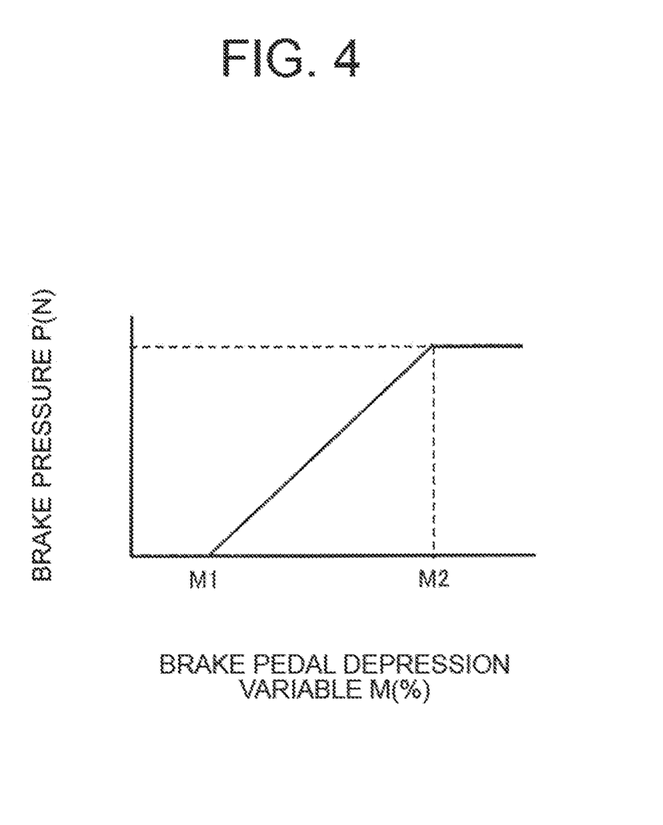
FIG. 4 is an illustrative diagram showing a relationship between a variable of depression of a brake pedal and a brake pressure.

FIG. 4 illustrates a relationship between the depression variable and the brake pressure of the brake pedal 21. As in FIG. 4, when the depression variable and the brake pressure of the brake pedal 21 are proportional to each other. As the depression variable of the brake pedal 21 becomes greater, the brake pressure becomes higher. The braking force becomes greater as the brake pressure becomes greater. The frictional heat generated due to braking of the brake is cooled by the brake cooling oil stored in the case of the disc brake 50.

The engine rotation speed sensor 14 and the accelerator pedal operation amount sensor 24 detect a rotation speed of the engine 1. As described above, the depression variable of the accelerator pedal 12 and the target engine rotation speed are proportional to each other. The engine rotation speed can be detected by one of the engine rotation speed sensor 14 and the accelerator pedal operation amount sensor 24. In the present embodiment, one of the engine rotation speed sensor 14 and the accelerator pedal operation amount sensor 24 may be omitted.

The brake pedal operation amount sensor 25 and the pressure sensor 26 are both sensors to detect brake pressures. As described above, the depression variable and the brake pressure of the brake pedal 21 are proportional to each other. The brake pressure in response to the brake pedal operation amount of the brake pedal 21 is detectable using one of the brake pedal operation amount sensor 25 and the pressure sensor 26. In the present embodiment, one of the brake pedal operation amount sensor 25 and the pressure sensor 26 may be omitted.

Next, a structure and a function of the controller 10 will be explained in detail.

Figure 5:
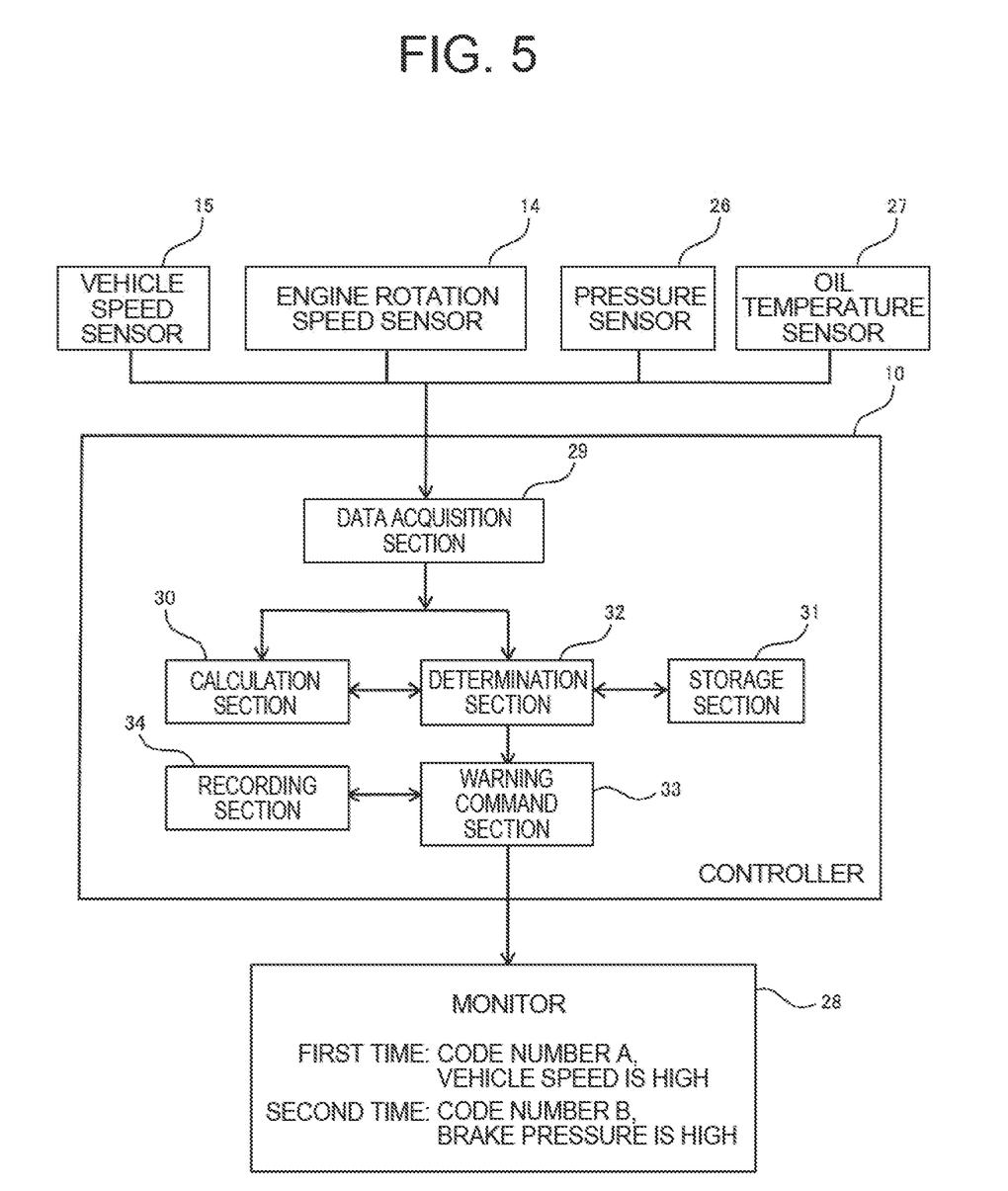
FIG. 5 is a block diagram of a controller.

FIG. 5 is a functional block diagram showing functions of the controller 10. Before the temperature of the brake cooling oil that cools the disc brake 50 overheats, the controller 10 notifies the operator of the state of the brake cooling oil. The monitor 28 is provided to the cab 121. The monitor 28 displays not only a warning about overheating but also the number of rotations (rotation speed) of the engine 1 and the vehicle speed.

As in FIG. 5, the controller 10 has a data acquisition section 29, an operation section 30, a storage section 31, a determination section 32, a warning command section 33, and a recording section 34.

The data acquisition section 29 acquires data about an engine rotation speed outputted from the engine rotation speed sensor 14, a vehicle speed outputted from the vehicle speed sensor 15, a brake pressure of the brake pedal 21 outputted from the pressure sensor 26, and a temperature of the brake cooling oil outputted from the oil temperature sensor 27. As described above, the accelerator pedal operation amount sensor 24 may be used instead of the engine rotation speed sensor 14 to acquire the data about the engine rotation speed. The brake pedal operation amount sensor 25 may be used instead of the pressure sensor 26 to acquire the data about the brake pressure of the brake pedal 21.

Since the point in time at which the vehicle speed is a predetermined speed or more, the calculation section 30 sequentially calculates average values as average vehicle speeds to output the average vehicle speeds to the determination section 32.

The storage section 31 stores thresholds corresponding to the engine rotation speed, vehicle speed, brake pressure, set oil temperature of the brake cooling oil. Each threshold is used to determine that the temperature of the brake cooling oil is likely to overheat. That is, each threshold is used to determine whether operational driving, operational content, or operational duration is likely to cause an increase in the temperature of the brake cooling oil.

The determination section 32 compares the engine rotation speed, vehicle speed, brake pressure, and temperature of the brake cooling oil that are acquired in the data acquisition section 29 and the average vehicle speed calculated in the calculation section 30 to the respective thresholds stored in the storage section 31. The determination section 32 determines whether the after-mentioned specific condition is fulfilled. The determination section 32 then outputs the determination result to the warning command section 33.

The warning command section 33 outputs content of the specific condition to the recording section 34 when the determination section 32 determines that the specific condition is fulfilled. The warning command section 33 then outputs a warning command to make the monitor 28 display that the temperature of the brake cooling oil is likely to overheat in the mode responsive to the content of the specific condition.

The recording section 34 is a recording medium such as a ROM and an optical disc that are accessible from the outside. A serviceman, etc. can read contents of specific conditions and historical information about the contents of specific conditions recorded in the recording section 34.

The monitor 28 includes a liquid crystal panel, etc. When receiving a driving signal from the warning command section 33, the monitor 28 displays a warning that the temperature of the brake cooling oil is increasing on a display screen as code numbers A, B, characters, marks, etc. In this case, it is preferable that the warning on the display screen blinks or is displayed in a different color from a background color to warn the operator. An alarm sound such as a buzzer may also be used.

Next, concrete processes executed in the controller 10 will be explained in reference to Examples 1 to 5. In each example, explanation of the same structure is appropriately omitted.

Example 1

Figure 6:
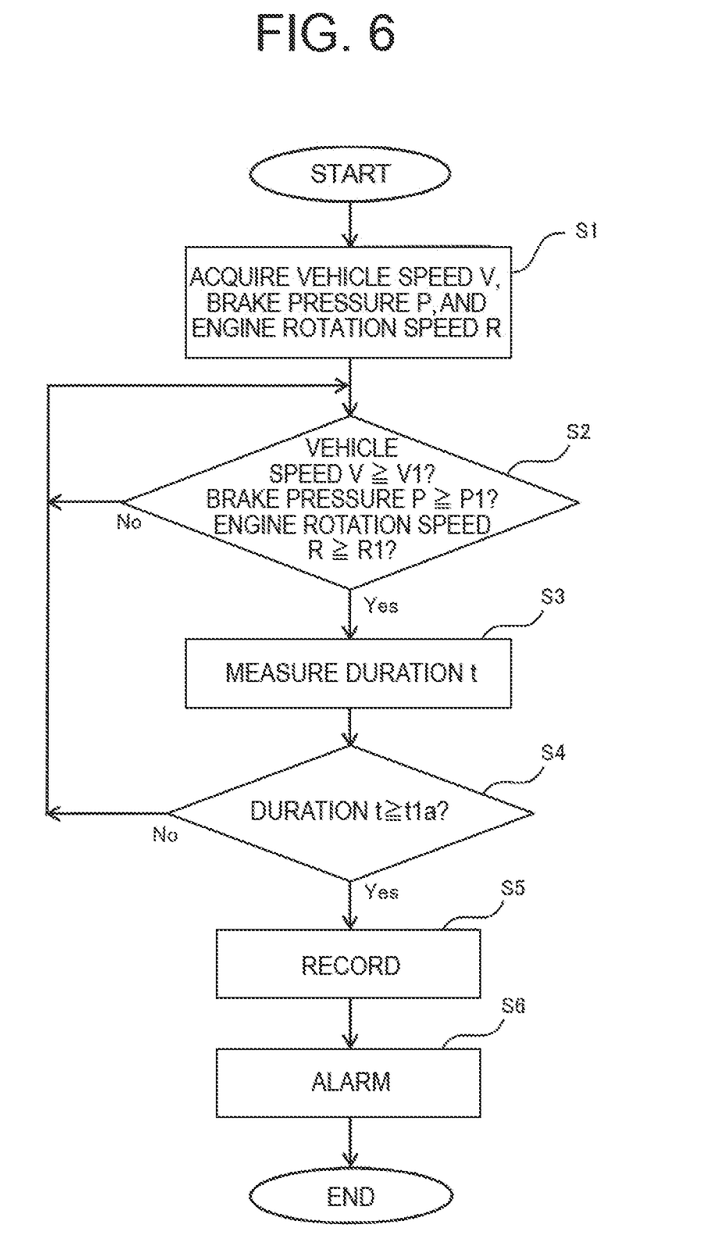
FIG. 6 is a flowchart showing processing of a controller of Example 1.

FIG. 6 is a flowchart showing processing of the controller 10 of Example 1. In Example 1, a duration of the driving state in which the temperature of the brake cooling oil easily increases is measured. When the duration is equal to or more than a first duration ($t1a$), a warning is issued. The first duration $t1a$ of Example 1 is preset. The first duration $t1a$ is set to the stage before overheating under the assumption of brake drag in loading operations. The first duration t1a corresponds to a vehicle speed V1, a brake pressure P1, and an engine rotation speed R1. In Example 1, to determine whether the driving state easily causes an increase in the temperature of the brake cooling oil, three parameters of the brake pressure P detected by the pressure sensor 26, the vehicle speed V detected by the vehicle speed sensor 15, and the engine rotation speed R detected by the engine rotation speed sensor 14 are used. As described above, it is also possible to use the brake pedal operation amount sensor 25 instead of the pressure sensor 26 or the accelerator pedal operation amount sensor 24 instead of the engine rotation speed sensor 14.

As in FIG. 6, the data acquisition section 29 first acquires the vehicle speed V from the vehicle speed sensor 15, the brake pressure P from the pressure sensor 26, and the engine rotation speed R from the engine rotation speed sensor 14 (Step S1).

Next, the determination section 32 determines whether the vehicle speed V, brake pressure P, and engine rotation speed R acquired at Step S1 are equal to or more than the thresholds that are stored in the storage section 31 and that correspond to the sensors 14, 15, and 26, respectively (Step S2). Specifically, the determination section 32 determines whether three conditions: (a) vehicle speed V≥threshold V1 (first threshold: for example, 3 km/h); (b) brake pressure P≥threshold P1 (second threshold, for example, 0.3 MPa); and (c) engine rotation speed R≥threshold R1 (third threshold, for example, 1200 rpm) are all fulfilled. When determining that all the three conditions are fulfilled (Step S2/Yes), the determination section 32 starts a timer and measures a duration of the conditions (a) to (c), that is, a duration t (Step S3).

Next, the determination section 32 determines whether the measured duration t is equal to or more than the first duration t1a (for example, 15 seconds) (Step S4). When the duration t continues for the first duration t1a or more (Step S4/Yes), the determination section 32 determines that a specific condition is fulfilled and outputs the signal that the specific condition is fulfilled to the warning command section 33. Simultaneously, the determination section 32 outputs numerical information about each parameter to the warning command section 33 as content of the specific condition. When any of the vehicle speed V, brake pressure P, and engine rotation speed R is less than the threshold (Step S2/No) and when it is determined that the duration t is shorter than the first duration t1 at Step S4 (Step S4/No), Step S2 is returned.

Upon receiving the signal that the specific condition is fulfilled and numerical information about each parameter from the determination section 32, the warning command section 33 records the fulfilment of the specific condition and the numerical information about each parameter together with the received time in the recording section 34 (Step S5). For example, the information that the vehicle speed V is equal to 4 km/h, that the brake pressure P is equal to 0.4 MPa, and that the engine rotation speed R is equal to 1400 rpm is recorded in association with the fulfilment of the specific condition and a time of the fulfilment (Step S5). The recording section 34 records the information that the specific condition is fulfilled (that is, the temperature of the brake cooling oil is likely to overheat) and the detection values of the vehicle speed V, brake pressure P, engine rotation speed R at the fulfilment of the specific condition as historical information.

Upon receiving the signal that the specific condition is fulfilled from the determination section 32, the warning command section 33 outputs a warning command that makes the monitor 28 generate an alarm (warning) to the monitor 28 to display the warning that the temperature of the brake cooling oil is increasing (Step S6) on the display screen of the monitor 28. The warning command section 33 outputs a different warning command in response to the information about each parameter transmitted from the determination section 32. Specifically, different warning commands are respectively outputted when the vehicle speed V is much greater than the threshold V1, when the brake pressure P is much greater than the threshold P1, and when the engine rotation speed R is much greater than the threshold R1.

The monitor 28 that has received the warning command displays the fulfillment of the specific condition on the screen in a different mode (for example, different code numbers A, B and display characters) in response to the warning command (see FIG. 5). Even in a different display mode, the warning means that the temperature of the brake cooling oil increases and is likely to overheat.

The operator sees the warning command on the monitor 28 and can be notified that the temperature of the brake cooling oil increases and is likely to overheat. Additionally, the operator can recognize what driving behavior causes the increasing temperature. In Example 1, a warning is generated when the state that the vehicle speed V is equal to or more than 3 km/h, the brake pressure P is equal to or more than 0.3 MPa, and the engine rotation speed R is equal to or more than 1200 rpm continues for 15 seconds or more. For example, when seeing the warning command on the monitor 28, the operator recognizes that the temperature of the brake cooling oil increases due to brake drag by the operator who is operating the accelerator at loading operations. The operator easily can recognize which is great among the vehicle speed V, brake pressure P, and engine rotation speed R by seeing the mode of the warning display on the monitor 28. The operator can easily confirm the driving operation to be improved.

Example 2

Figure 7:
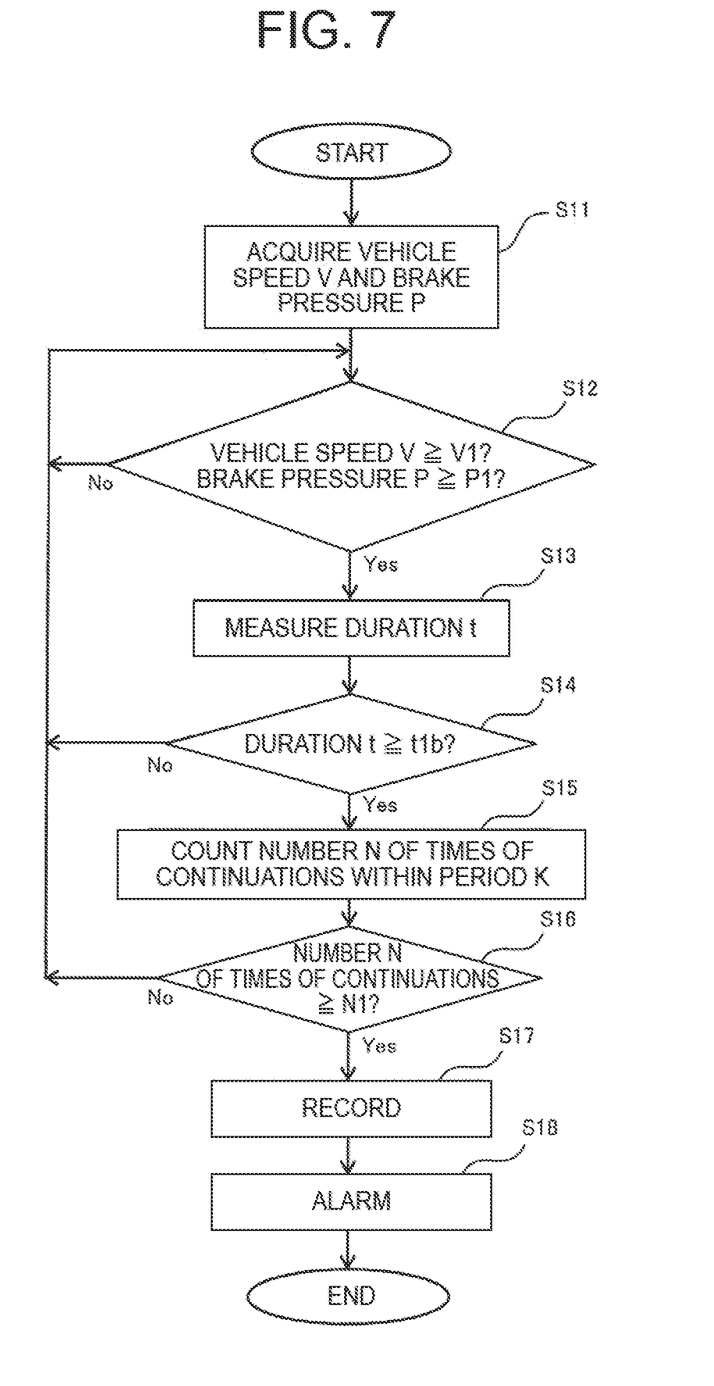
FIG. 7 is a flowchart showing processing of a controller of Example 2.

FIG. 7 is a flowchart showing processing of the controller 10 of Example 2. In Example 2, the number of occurrences (fulfilments of the specific condition) of the operational state in which the temperature of the brake cooling oil easily increases is counted within a predetermined period (K1). When the number of occurrences is equal to or more than a predetermined number of times (N1), a warning is generated. A first duration t1b in Example 2 is a preset time. The first duration t1b is set to a stage before overheating under the assumption of an operation having an unnecessarily high frequency of brake operations. The first duration t1b corresponds to the vehicle speed V1 and brake pressure P1. Example 2 is different from Example 1 in that Steps S15 and S16 are added in Example 2.

As in FIG. 7, the data acquisition section 29 first acquires the vehicle speed V from the vehicle speed sensor 15 and the brake pressure P from the pressure sensor 26 (Step S11). Next, the determination section 32 determines whether the vehicle speed V and brake pressure P acquired at Step S11 are equal to or more than the thresholds (V1, P1) corresponding to the parameters stored in the storage section 31, respectively (Step S12). The values of the threshold V1 for the vehicle speed V and the threshold P1 for the brake pressure P are the same as in Example 1. When Step S12 indicates Yes, the determination section 32 starts a timer and measures a duration t (Step S13). The duration t is a duration of two states that (a) the vehicle speed V is equal to or more than the threshold V1 (for example, 3 km/h) and that (b) the brake pressure P is equal to or more than the threshold P1 (for example, 0.3 MPa).

The determination section 32 determines whether the duration t is equal to or more than the first duration t1b (for example, five seconds) (Step S14). The determination section 32 determines that the specific condition is fulfilled when the duration t continues for the first duration t1b or more (Step S14/Yes). The determination section 32 adds 1 to a number N of times of continuations (Step S15) to reset a timer that measures the duration t. The number N of times is the number of fulfilments of the specific condition. When the number N of times of continuations is equal to or more than the predetermined number N1 of times (for example, three times) within a predetermined period K (for example, three minutes), the determination section 32 determines that a notification condition is fulfilled and outputs the signal that the specific condition and notification condition are fulfilled to the warning command section 33. After that, as in Example 1, at step S17, the information from the warning command section 33 is recorded to the recording section 34. A predetermined warning is then displayed on the monitor 28 at Step S18. When Step S12 indicates No, when Step S14 indicates No, and when Step S16 indicates No, Step S12 is returned to again determine whether the specific condition and notification condition are fulfilled.

In Example 2, the warning is emitted when the state that the vehicle speed V equal to or more than 3 km/h and the brake pressure P equal to or more than 0.3 MPa continues for five seconds or more occurs three times or more within three minutes. The operator views the warning mode displayed on monitor 28. For example, the operator can recognize that an increase in the temperature of the brake cooling oil is caused by a high frequency of brake operations or by a high operational load.

At Step S11 in Example 2 as in Example 1, the engine rotation speed R detected by the engine rotation speed sensor 14 is further acquired. At Step S12, it may be determined whether three parameters of the vehicle speed V, brake pressure P, and engine rotation speed R are respectively equal to or more than thresholds.

Example 3

Figure 8:
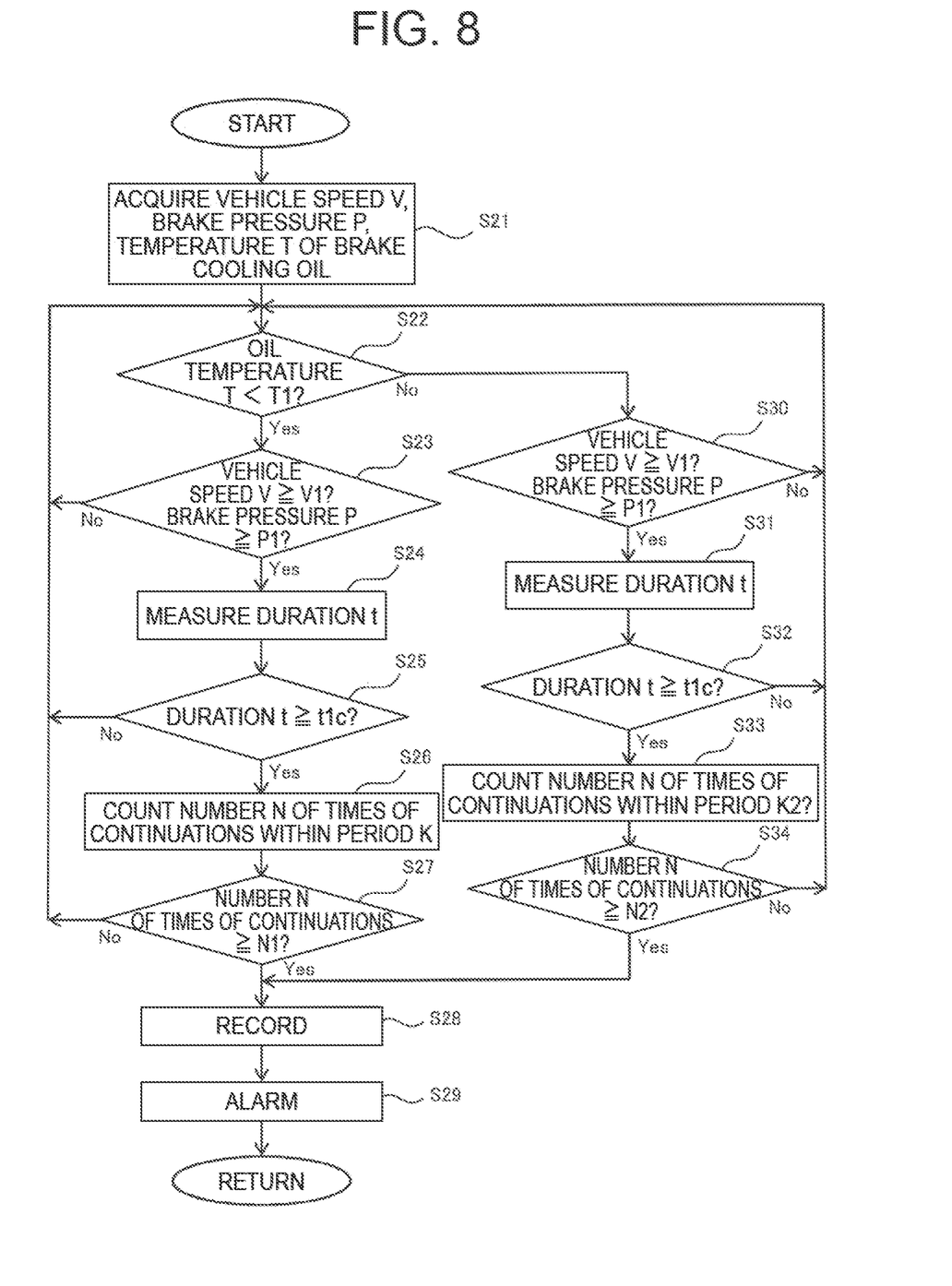
FIG. 8 is a flowchart showing processing of a controller of Example 3.

FIG. 8 is a flowchart showing processing of the controller 10 of Example 3. In Example 3, it is determined whether driving is in the state in which the temperature of the brake cooling oil easily increases through two stages using two parameters, namely the brake pressure P and vehicle speed V. A first duration t1c of Example 3 is preset. The first duration t1c is set to a stage before overheating under the assumption of multiple operational states such as a loading operation at a low speed, a long distance travel with a loading operation at a middle speed (load and carry), and a high speed travel. The first duration t1c corresponds to the brake pressure P1 per each vehicle speed V1 relating to multiple operation states. Example 3 is different from Example 2 mainly in that a type of sensor data acquired by the determination section 32 is different and in that a process of Step S22 is added to make the processes after Step S22 branch to Steps S23 to S27 (first stage) and to Steps S30 to S34 (second stage).

As in FIG. 8, the data acquisition section 29 first acquires the vehicle speed V from the vehicle speed sensor 15, the brake pressure P from the pressure sensor 26, and a temperature T from the oil temperature sensor 27 (Step S21).

Next, the determination section 32 determines whether the temperature T of the brake cooling oil acquired at Step S21 is lower than a set temperature T1 (Step S22). The set temperature T1 is set to a temperature rather lower than the upper limit temperature (about 120° C.) at which the temperature of the brake cooling oil overheats, such as 100° C. When the temperature T is lower than the set temperature T1 (T<T1), the processes (S23 to S27) similar to S12 to S16 in Example 2 are executed as the first stage processing. Specifically, the determination section 32 first determines whether the vehicle speed V is equal to or more than the threshold V1 and the brake pressure P is equal to or more than the threshold P1 (Step S23). In Example 3, the threshold V1 and threshold P1 at step S23 are the same as Example 2. A different time is set as the first duration t1c at Step S25 in response to the vehicle speed V. Specifically, the first duration t1c for the vehicle speed V equal to or more than 3 km/h and less than 6 km/h is set to five seconds, the first duration t1c for the vehicle speed V equal to or more than 6 km/h and less than 10 km/h is set to three seconds, and the first duration t1c for the vehicle speed V equal to or more than 10 km/h is set to two seconds.

When Step S23 indicates Yes, the determination section 32 starts a timer and measures a duration during which the vehicle speed V and brake pressure P are equal to or more than the respective thresholds, that is, the duration t (Step S24). The determination section 32 then determines whether the duration t is equal to or more than the first duration t1c (five seconds, three seconds, two seconds) in response to the vehicle speed V (Step S25). When Step S25 indicates Yes, the determination section 32 adds 1 to the number N of times of continuations of continuations that is the number of times of fulfilments of the specific condition (Step S26) and resets the timer that measures the duration t. When the number N of times of continuations is equal to or more than the predetermined number N1 of times (for example, three times) (Step S27/Yes) during the predetermined period K1 (for example, three minutes), the determination section 32 determines that the notification condition is fulfilled and transmits a signal to make the warning command section 33 output the first warning command. After that, as in Examples 1 and 2, the information from the warning command section 33 is recorded to the recording section 34 at Step S28. A predetermined warning is then displayed on the monitor 28 at Step S29. When Step S23 indicates No, when Step S25 indicates No, and when Step S27 indicates No, Step S22 is returned to again determine whether the specific condition and notification condition are fulfilled.

At step S22, when the temperature T of the brake cooling oil is higher than the set temperature T1 (T≥T1), Steps S30 to S34 are executed as the second stage processing. The processes of Step S30 to S34 are substantially the same as the processes of Step S23 to S27. The determination condition differs between Step S27 and Step S34. Specifically, at Step S27, it is determined whether the number N of times of continuations is equal to or more than three times (predetermined number N1 of times=3) within three minutes (predetermined period K1=three minutes). In contrast, at Step S34, it is determined whether the number N of times of continuations is equal to or more than twice (predetermined number N2 of times=2) within two minutes (predetermined period K1=two minutes). Step S27 is thus different from Step S34.

The first warning is emitted in the first stage in which the temperature T of the brake cooling oil is lower than the set temperature T1 (100° C.). At the second stage in which the temperature T of the brake cooling oil is higher than the set temperature T1 and less than the upper limit temperature (about 120° C.) at which overheating occurs, the second warning is emitted. The increase in the temperature of the brake cooling oil can be grasped in more detail. The first duration t1c is set differently in response to the vehicle speed V in Example 3. In response to the work state (for example, loading, load and carry, high speed travel), etc., the warning for the increase in the temperature of the brake cooling oil is appropriately emitted. The operator can grasp the possibility of overheating of the brake cooling oil temperature more certainly in response to the work state and can work to prevent overheating.

The predetermined period K2 and the predetermined number N2 of times in the second stage is smaller in value than the predetermined period K1 and the predetermined number N1 of times in the first stage. Since the warning is emitted rather early when the temperature of the brake cooling oil exceeds 100° C., overheating of the temperature of the brake cooling oil can be prevented more certainly.

Example 4

Figure 9:
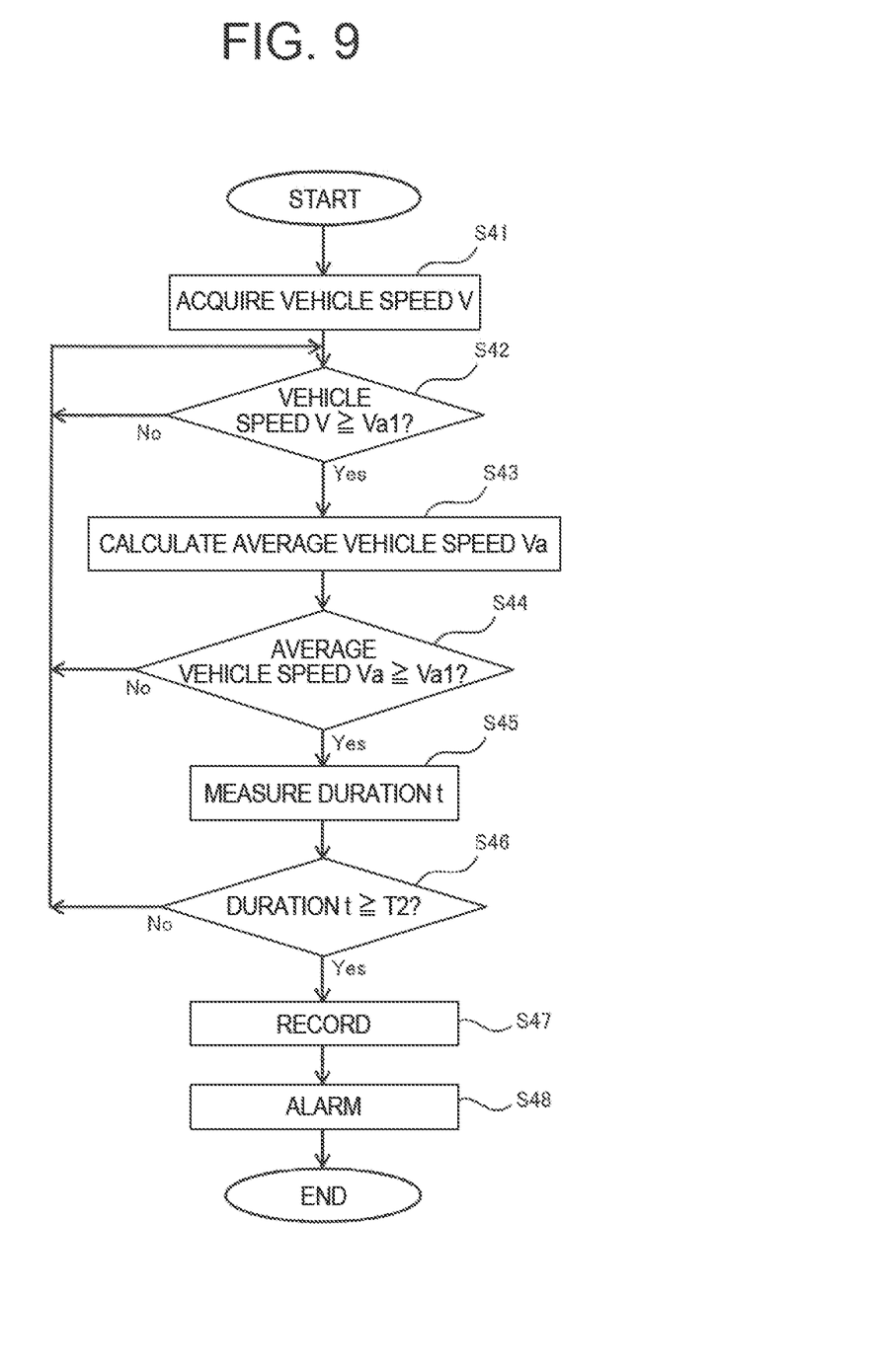
FIG. 9 is a flowchart showing processing of a controller of Example 4.

FIG. 9 is a flowchart showing processing of the controller 10 of Example 4. In Example 4, the average value of the vehicle speed V since the vehicle speed V is equal to or more than a threshold Va1 (fourth threshold: for example, 25 km/h) is calculated as an average vehicle speed Va. When the state in which the average vehicle speed Va is equal to or more than the threshold Va1 continues for a second duration t2 of Example 4 or more, a warning is emitted. The second duration t2 of Example 4 is preset. The second duration t2 is set to the stage before overheating under the assumption of high speed travel. The second duration t2 corresponds to the average vehicle speed Va1.

As in FIG. 9, the data acquisition section 29 first acquires the vehicle speed V from the vehicle speed sensor 15 (Step S41). The determination section 32 determines whether the vehicle speed V acquired at Step S41 is equal to or more than the threshold Va1 (Step S42). When the vehicle speed is equal to or more than the threshold Va1 at step S42, the determination section 32 outputs a command signal to the calculation section 30. The calculation section 30 sequentially calculates an average value of the vehicle speed V as the average vehicle speed Va in response to this command signal (Step S43).

Next, the determination section 32 determines whether the average vehicle speed Va calculated in the calculation section 30 is equal to or more than the threshold Va1 (Step S44). When the average vehicle speed Va is equal to or more than the threshold Va1 (Step S44/Yes), the determination section 32 starts the timer and measures the duration during which the average vehicle speed Va equal to or more than the threshold Va1 continues, i.e., the duration t (Step S45).

Next, the determination section 32 determines whether the duration t is equal to or more than the second duration t2 (for example, 40 minutes) (Step S46). The determination section 32 outputs the signal that the specific condition is fulfilled to the warning command section 33 when the duration t continues for the second duration t2 or more (Step S46/Yes). After that, as in Examples 1 to 3, at step S47, the information from the warning command section 33 is recorded to the recording section 34. A predetermined warning is then displayed on the monitor 28 at step S48. When Step S42 indicates No, when Step S44 indicates No, and when Step S46 indicates No, Step S42 is returned to again determine whether the specific condition is fulfilled.

According to the Example 4, a warning is displayed on the monitor 28. The operator can recognize that the temperature of the brake cooling oil is likely to overheat due to the long duration or high ratio of high speed travel. Therefore, for example, overheating is preventable, e.g., by reducing the vehicle speed of travel.

In Example 4, when the average vehicle speed Va is 25 km/h or more and less than 30 km/h, the second duration t2 is set to 40 minutes. The second duration t2 is changed to 30 minutes when the average vehicle speed Va is 30 km/h or more. The determination section 32 may then determine fulfilment of the specific condition. In this case, since a warning is emitted earlier when the vehicle speed is faster, overheating of the brake cooling oil temperature can be prevented more certainly.

Example 5

Figure 10:
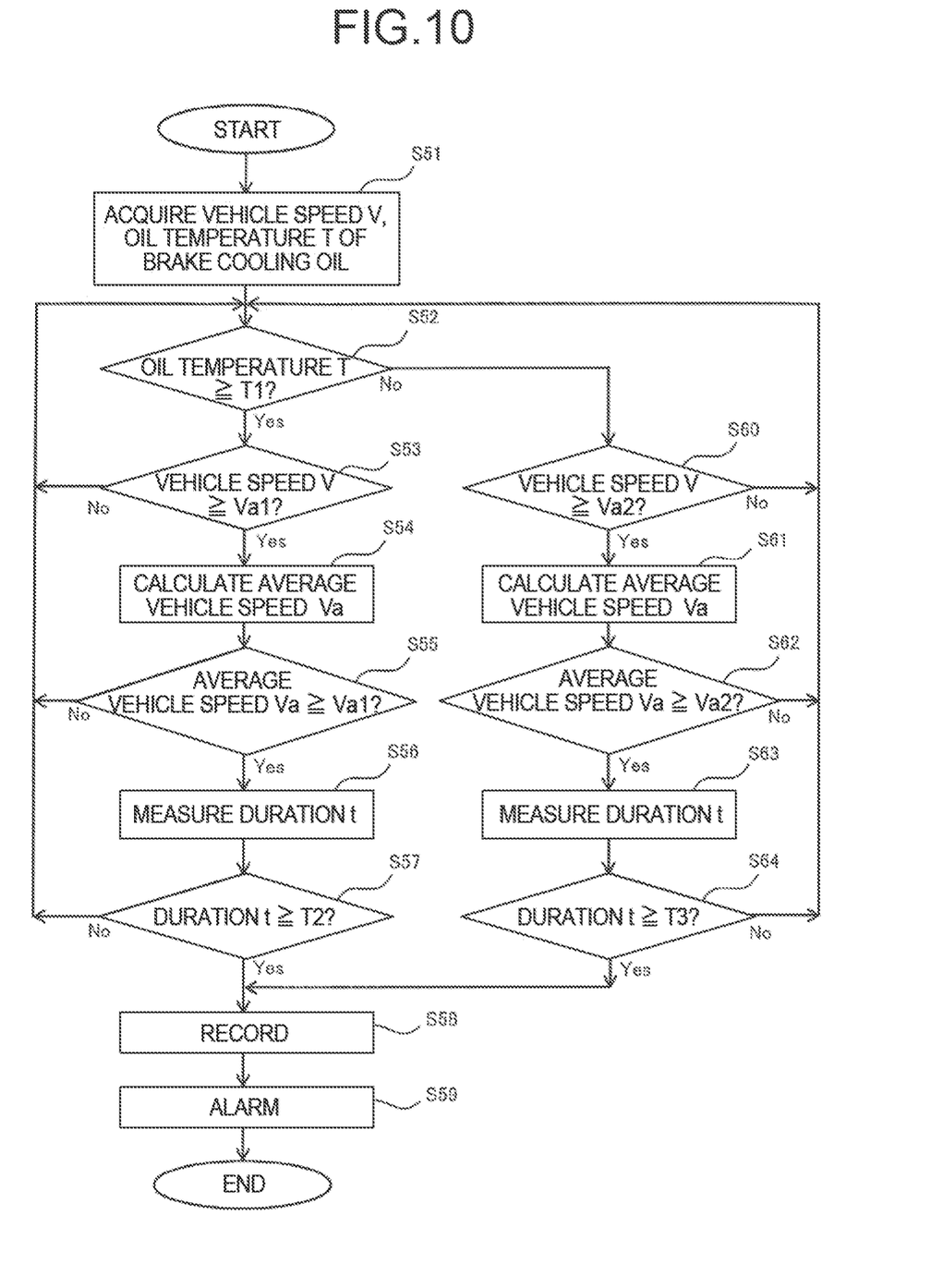
FIG. 10 is a flowchart showing processing of a controller of Example 5.

FIG. 10 is a flowchart showing processing of the controller 10 of Example 5. In Example 5, it is determined whether the driving state causes the temperature of the brake cooling oil to easily increase through two stages by calculating the average of the vehicle speed V. The second duration t2 of Example 5 is the same as the preset time explained in Example 4. A second duration t3 of Example 5 is preset. The second duration t3 is set to the stage before overheating under the assumption of operation of the brake in high speed travel. The second duration t3 corresponds to an average vehicle speed Va2 when the brake cooling oil is equal to or more than the temperature T1. Example 5 is different from Example 4 mainly in that the type of sensor data acquired by the determination section 32 is different and in that the process of Step S52 is added and the processes since Step S52 branch to Steps S53 to S57 (first stage) and to Steps S60 to S64 (second stage).

As in FIG. 10, the data acquisition section 29 first acquires the vehicle speed V from the vehicle speed sensor 15 and the temperature T from the oil temperature sensor 27 (Step S51).

Next, the determination section 32 determines whether the temperature T of the brake cooling oil acquired at Step S51 is lower than the set temperature T1 (Step S52). The set temperature T1 is set as the temperature, for example, 100° C. that is rather lower than the upper limit temperature (about 120° C.) at which the brake cooling oil overheats. When the temperature T is lower than the set temperature T1 (T<T1), the processes (S53 to S57) that are the same as S42 to S46 of Example 4 are performed as the first stage processing. Specifically, the determination section 32 first determines whether the vehicle speed V is equal to or more than the threshold Va1 (Step S53). When the vehicle speed V is equal to or more than the threshold Va1 at Step S53 (Step S53/Yes), the calculation section 30 sequentially calculates an average value of the vehicle speed V as the average vehicle speed Va (Step S43).

Next, the determination section 32 determines whether the average vehicle speed Va is equal to or more than the threshold Va1 (Step S55). When the average vehicle speed Va is equal to or more than the threshold Va1 (Step S55/Yes), the determination section 32 starts a timer and measures a duration during which the average vehicle speed Va equal to or more than the threshold Va1 continues, that is, the duration t (Step S56). Next, the determination section 32 determines whether the duration t is equal to or more than the second duration t2 (for example, 40 minutes) (Step S57). The determination section 32 outputs the signal that the specific condition is fulfilled to the warning command section 33 when the duration t continues for the second duration t2 or more (Step S57/Yes).

After that, at step S58 as in Example 4, the information from the warning command section 33 is recorded to the recording section 34. A predetermined warning is then displayed on the monitor 28 at Step S59. When Step S53 indicates No, when Step S55 indicates No, and when Step S57 indicates No, Step S52 is returned to again determine whether the specific condition is fulfilled.

At step S52, when the temperature T of the brake cooling oil is higher than the set temperature T1 (T≥T1), the processes at Steps S60 to S64 are executed as the second stage processing. The processes at Steps S60 to S64 are substantially the same as Steps S53 to S57. The determination condition at Step S55 is different from the determination condition at Step S62. The determination condition at Step S57 is different from the determination condition at Step S64. Specifically, at Step S55, it is determined whether the average vehicle speed Va is equal to or more than 25 km/h (threshold Va1=25 km/h). At Step S57, it is determined whether the duration t is equal to or more than 40 minutes (second duration t2=40 minutes). At Step S62, it is determined whether the average vehicle speed Va is equal to or more than 20 km/h (threshold Va2=20 km/h). At Step S64, it is determined whether the duration t is equal to or more than 15 minutes (the second duration t3=15 minutes).

According to Example 5, in the first stage in which the temperature T of the brake cooling oil is lower than the set temperature T1 (100° C.), the first warning is emitted. In the second stage in which the temperature T of the brake cooling oil is higher than the set temperature T1 and less than the upper limit temperature (about 120° C.) at which overheating occurs, the second warning is emitted. The increase in the temperature of the brake cooling oil can be thus grasped in more detail. In Example 5, the threshold Va2 and the second duration t3 that are set in the second stage are smaller than the threshold Va1 and the second duration t2 that are set in the first stage. The warning is emitted earlier when the temperature of the brake cooling oil exceeds 100° C. Overheating of the brake cooling oil temperature can be prevented more certainly.

As described above, in the wheel loader 100 (work vehicle) of the embodiments of the present invention, the controller 10 displays the possibility of overheating on the monitor 28 before the temperature of the brake cooling oil overheats. The operator can improve driving operations by viewing the display of the monitor 28 to prevent overheating of the temperature of the brake cooling oil.

As in Examples 1 to 5, the thresholds are set corresponding to the various parameters such as the vehicle speed V, brake pressure P, and engine rotation speed R. The controller 10 appropriately determines the operational driving, operational content, operational duration, etc. in which the temperature of the brake cooling oil easily increases. The controller 10 can exactly notify the operator of the cause of an increase in the temperature of the brake cooling oil. Various pieces of the information when the warning is generated are recorded to the recording section 34 as histories. The phenomena and causes of an increase in the temperature of the brake cooling oil can be ascertained by accessing the recording section 34 from the outside.

The above embodiments are examples for description of the present invention. The scope of present invention is not limited to only the above embodiments. The persons skilled in the art can carry out the present invention in other various modes without deviating from the scope of the present invention.

For example, the controller 10 uses any one or combination of the parameters for the vehicle speed V, brake pressure P, brake pedal operation amount, accelerator pedal operation amount, and engine rotation speed R to determine the possibility of overheating of the brake cooling oil temperature. The controller 10 can then emit a warning.

REFERENCE SIGNS LIST

1 . . . Engine
10 . . . Controller
12 . . . Accelerator pedal
14 . . . Engine rotation speed sensor
15 . . . Vehicle speed sensor
21 . . . Brake pedal
24 . . . Accelerator pedal operation amount sensor
25 . . . Brake pedal operation amount sensor
26 . . . Pressure sensor (Brake pressure sensor)
27 . . . Oil temperature sensor (Cooling oil temperature sensor)
28 . . . Monitor (Notification device)
29 . . . Data acquisition section
30 . . . Operation section
31 . . . Storage section
32 . . . Determination section
33 . . . Warning command section
34 . . . Recording section
50 . . . Disk brake (Brake device)
100 . . . Wheel loader (Work vehicle)

The invention claimed is:

1. A work vehicle including an engine, a hydraulic brake device that generates a braking force in response to a pressure of a hydraulic oil, and a brake pedal that operates the brake device,
the work vehicle comprising:
at least one of a brake pedal operation amount sensor that detects an operation amount of the brake pedal and a brake pressure sensor that detects a pressure of a hydraulic oil supplied to the brake device;
a cooling oil temperature sensor that detects a temperature of a cooling oil that cools the brake device;
a vehicle speed sensor that detects a vehicle speed;
a notification device that notifies an operator of information about a temperature of the cooling oil to; and
a controller that controls the notification device,
wherein the controller compares each detection value detected from at least one of the brake pedal operation amount sensor and the brake pressure sensor and the vehicle speed sensor to each predetermined threshold corresponding to each of the sensors, and in a case where a state that at least one of the detection values is equal to or more than the threshold continues for a first duration or more, the controller outputs a warning command indicating high possibility of overheating of a temperature of the cooling oil to the notification device.

2. The work vehicle according to claim 1, further comprising:
an accelerator pedal that adjusts a rotation speed of the engine;
an accelerator pedal operation amount sensor that detects an operation amount of the accelerator pedal; and
an engine rotation speed sensor that detects a rotation speed of the engine,
wherein in a case where a state that a detection value from the vehicle speed sensor is equal to or more than a first threshold, a detection value from the brake pedal operation amount sensor or the brake pressure sensor is equal to or more than a second threshold and a detection value from the accelerator pedal operation amount sensor or a detection value from the engine rotation speed sensor is equal to or more than a third threshold continues for the first duration or more, the controller outputs a warning command that a temperature of the cooling oil is likely to overheat to the notification device.

3. The work vehicle according to claim 1,
wherein in a case where the times that a state that a detection value from the vehicle speed sensor is equal to or more than a first threshold and a detection value from the brake pedal operation amount sensor or the brake pressure sensor is equal to or more than a second threshold continues for the first duration or more have reached a predetermined number of times or more within a predetermined period, the controller outputs the warning command.

4. The work vehicle according to claim 3,
wherein the controller outputs the warning command for a first time at a first stage at which a temperature of the cooling oil detected by the cooling oil temperature sensor is less than a set temperature less than an upper limit temperature at which overheating occurs, and outputs the warning command for a second time at a second stage at which a temperature of the cooling oil detected by the cooling oil temperature sensor is equal to or more than the set temperature and less than the upper limit temperature.

5. The work vehicle according to claim 4,
wherein set values of the predetermined period and of the predetermined number of times at the second stage are less than set values of the predetermined period and of the predetermined number of times at the first stage.

6. The work vehicle according to claim 1,
wherein since a point at which a detection value detected by the vehicle speed sensor is a fourth threshold or more, the controller calculates an average value of detection values detected by the vehicle speed sensor as an average vehicle speed, and outputs, to the notification device, a warning command that a temperature of the cooling oil is likely to overheat in a case where the average vehicle speed equal to or more than the fourth threshold continues for a second duration or more.

7. The work vehicle according to claim 6,
wherein the controller outputs the warning command for a first time at a first stage at which a temperature of the cooling oil detected by the cooling oil temperature sensor is less than a set temperature less than an upper limit temperature at which overheating occurs, and outputs the warning command for a second time at a second stage at which a temperature of the cooling oil detected by the cooling oil temperature sensor is equal to or more than the set temperature and less than the upper limit temperature.

8. The work vehicle according to claim 7
wherein set values of the second duration and of the fourth threshold at the second stage are less than set values of the second duration and of the fourth threshold at the first stage.

9. The work vehicle according to claim 1 comprising a monitor as the notification device,
wherein the controller records numerical information about each of the sensors on outputting the warning command to the notification device onto a recording section and displays that a temperature of the cooling oil is likely to overheat on the monitor.

* * * * *